United States Patent [19]
Daly et al.

[11] 3,970,997
[45] July 20, 1976

[54] HIGH SPEED PERIPHERAL SYSTEM INTERFACE

[75] Inventors: Robert M. Daly, Westford; John E. Mekota, Jr., Belmont; Gary J. Goss, Acton, all of Mass.

[73] Assignee: Honeywell Information Systems, Inc., Waltham, Mass.

[22] Filed: Aug. 29, 1974

[21] Appl. No.: 501,583

[52] U.S. Cl. .......................................... 340/172.5
[51] Int. Cl.² ........................................ G06F 3/00
[58] Field of Search ................ 340/172.5; 445/1

[56] References Cited
UNITED STATES PATENTS

| | | | |
|---|---|---|---|
| 3,331,055 | 7/1967 | Betz et al. | 340/172.5 |
| 3,560,936 | 2/1971 | Busch | 340/172.5 |
| 3,639,911 | 2/1972 | Frieband et al. | 340/172.5 |
| 3,680,057 | 7/1972 | Blessin et al. | 340/172.5 |
| 3,772,657 | 11/1973 | Marsalka et al. | 340/172.5 |
| 3,828,325 | 8/1974 | Stafford et al. | 340/172.5 |
| 3,848,233 | 11/1974 | Lotan et al. | 340/172.5 |

*Primary Examiner*—Mark E. Nusbaum
*Attorney, Agent, or Firm*—Faith F. Driscoll; Ronald T. Reiling; Nicholas Prasinos

[57] ABSTRACT

A peripheral interface system connects a peripheral control unit (PCU) which controls a plurality of input/output devices having different data byte transfer rates with an input/output controller (IOC) of a data processing system. (A byte as used herein is defined as a desired predetermined number of bits, typically seven to 10 bits, although it could be one bit). When the byte transfer rate is less than the maximum asynchronous byte transfer rate of the interface system, the system operates in a first mode in which transfers of bytes of information by the data processing system are controlled to be in synchronism with the energization and deenergization of a pair of strobe control lines of the interface system. When the transfer of bytes is to exceed the maximum asynchronous byte transfer rate of the interface system, the IOC conditions the interface to operate in a second mode established by an additional pair of control lines. A first one of the control lines is energized by the PCU when an input/output device is to transfer data at a rate greater than the maximum asynchronous rate. The IOC in response to the energization of the first control line in turn energizes the second control line signalling that the transfer can proceed at a rate greater than the maximum asynchronous rate. Means included in both PCU and IOC are responsive to the joint energization of the first and second control lines to condition the interface system to transfer bytes synchronously at a rate greater than the maximum asynchronous rate. The synchronous transfer is established by timing signals applied to the pair of strobe control lines and generated by clock circuits included in the peripheral controller and IOC.

16 Claims, 3 Drawing Figures

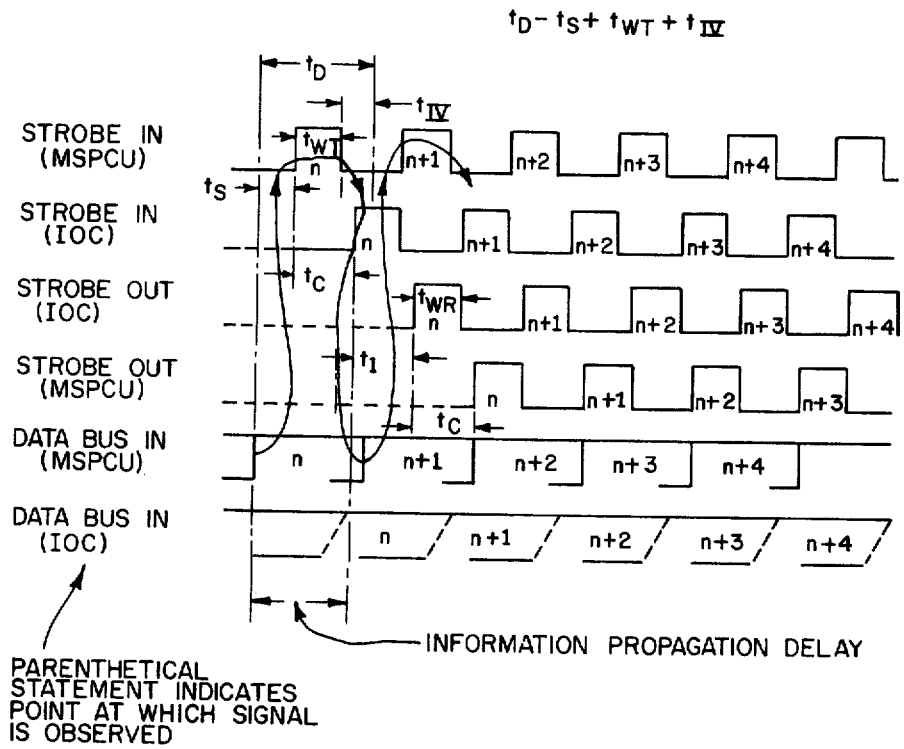

- $t_C$ = TRANSMISSION DELAY: DRIVER + CABLE + RECEIVER
- $t_D$ = TOTAL DELAY FOR TRANSMISSION OF ONE INFORMATION UNIT
- $t_S$ = SKEW PROTECTION INTERVAL
- $t_{WR}$ = DURATION OF IOC'S STROBE PULSE (FIXED BY IOC)
- $t_{WT}$ = DURATION OF MSPCU'S STROBE PULSE (FIXED BY MSPCU)
- $t_1$ = TIME FOR CHANNEL TO SET ITS STROBE PULSE AFTER DETECTING THE SET OF THE IOC'S STROBE PULSE
- $t_{IV}$ = TIME FOR IOC TO PREPARE TO SET ITS STROBE PULSE FOR THE NEXT INFORMATION TRANSFER

⟶ SEQUENCE FLOW LINE

FIG. 3

HIGH SPEED PERIPHERAL SYSTEM INTERFACE

BACKGROUND OF THE INVENTION

1. Field of the Invention

This invention relates to data transfer systems and more particularly to an improved interface system for connecting a data processing system and peripheral control unit for transferring data between the system and a plurality of input/output devices.

2. Prior Art

In general, it is well known to provide interface systems which operate in so-called asynchronous or D.C. interlocked modes. (See U.S. patent to W. F. Beausoleil et al U.S. Pat. No. 3,336,582 issued Aug. 15, 1967). More particularly, such interfaces transfer successive groups of data signals by synchronizing them with the rise and fall of interlocked strobe or tag signals. An advantage of such systems is that interface operations are made independent of data transfer rates of the input/output devices or peripheral controllers which couple to the interface. Because transfer of bytes cannot proceed until the required sequence of strobe or tag signals has been completed by the units, as for example, an input/output controller (IOC) and a peripheral control unit (PCU) which couple to the interface system, the data transfer rate is limited by the speed of the circuits and four times the length of the lines --i.e. time to propagate the rise and fall of signals in both directions connecting the IOC with a PCU.

In order to increase the speed of D.C. interlocked systems, one system includes an additional set of control lines within the interface system so that the operation of the additional control lines can be overlapped with the operation of the strobe or tag lines such that the transfer rate is approximately doubled. For an example of this type of system reference may be made to U.S. Pat. No. 3,582,906.

While the above system transfer rate is increased, the interface system can only provide a transfer rate up to twice the maximum rate established by one of the pairs of control lines.

OBJECTS OF THE INVENTION

Accordingly, it is a primary object of the present invention to provide an interface system which increases the rate of transfer over a normal D.C. interlocked interface.

It is a further object of the present invention to provide an improved interface system for transferring information at a speed higher than that normally accommodated by the asynchronous interface system while still providing the advantages of a D.C. interlocked interface when such higher speed transfer is not required.

It is a further object of the invention to provide a high transfer rate of information which is independent of the cable length connecting the Input/Output Control unit (IOC) with the Mass Storage Peripheral Control Unit (MSPCU) or other peripheral control unit or processor.

SUMMARY OF THE INVENTION

The above objects are accomplished in accordance with the present invention by providing an optional non-interlock mode of operation for the interface system. According to a preferred embodiment of the present invention, this is accomplished by providing an additional set of control lines "Hold and Suppress Interlock-In" and "Hold and Suppress Interlock-Out". During normal operation, a peripheral control unit PCU initiates transfers of data by energizing a strobe "in" line to which the data processing system responds by energizing its strobe "out" line. For data transfers by the data processing system to the PCU, the sequences of responses are reversed. That is, the data processing system or input/output control unit IOC energizes the strobe out line to which the PCU responds by energizing the strobe in line. When the data transfer is to proceed at a rate which is greater than the maximum asynchronous transfer rate of the interface, the PCU will initiate such an operation by energizing the suppress interlock in line. When the alternate mode is allowed by the data processing system or IOC, it responds by energizing the suppress interlock out line. Means included within the PCU in response to the energization of both control lines is operative to generate an enabling signal which allows bytes to be transferred at a rate greater than the maximum rate. The PCU further includes means for generating an adjustable strobe signal at the appropriate rate which is applied to the strobe in line providing synchronism of the data transfer occurring at such rates. The IOC provides means for answering strobe-in signal via the strobe out line.

In addition to retaining the advantages of a D.C. interlocked interface, the arrangement of the present invention can provide still higher data transfer rates for those input/output devices of peripheral control units which transfer data greater than input/output devices normally attached for operation and controlled by an asynchronous D.C. interlocked interface. Moreover, current input/output devices and PCU's which are not equipped to handle transfers at rates greater than the transfer rate of the interface, can still be attached to the interface without any change in form or design.

The foregoing advantages and other objects, features of the present invention will be better understood from the following description of the preferred embodiment with reference to the accompanying drawings.

BRIEF DESCRIPTION OF THE DRAWINGS

FIG. 3 is a timing diagram used to explain the operation of the system of FIG. 1.

DESCRIPTION OF THE PREFERRED EMBODIMENT

General Description

Figure 1:
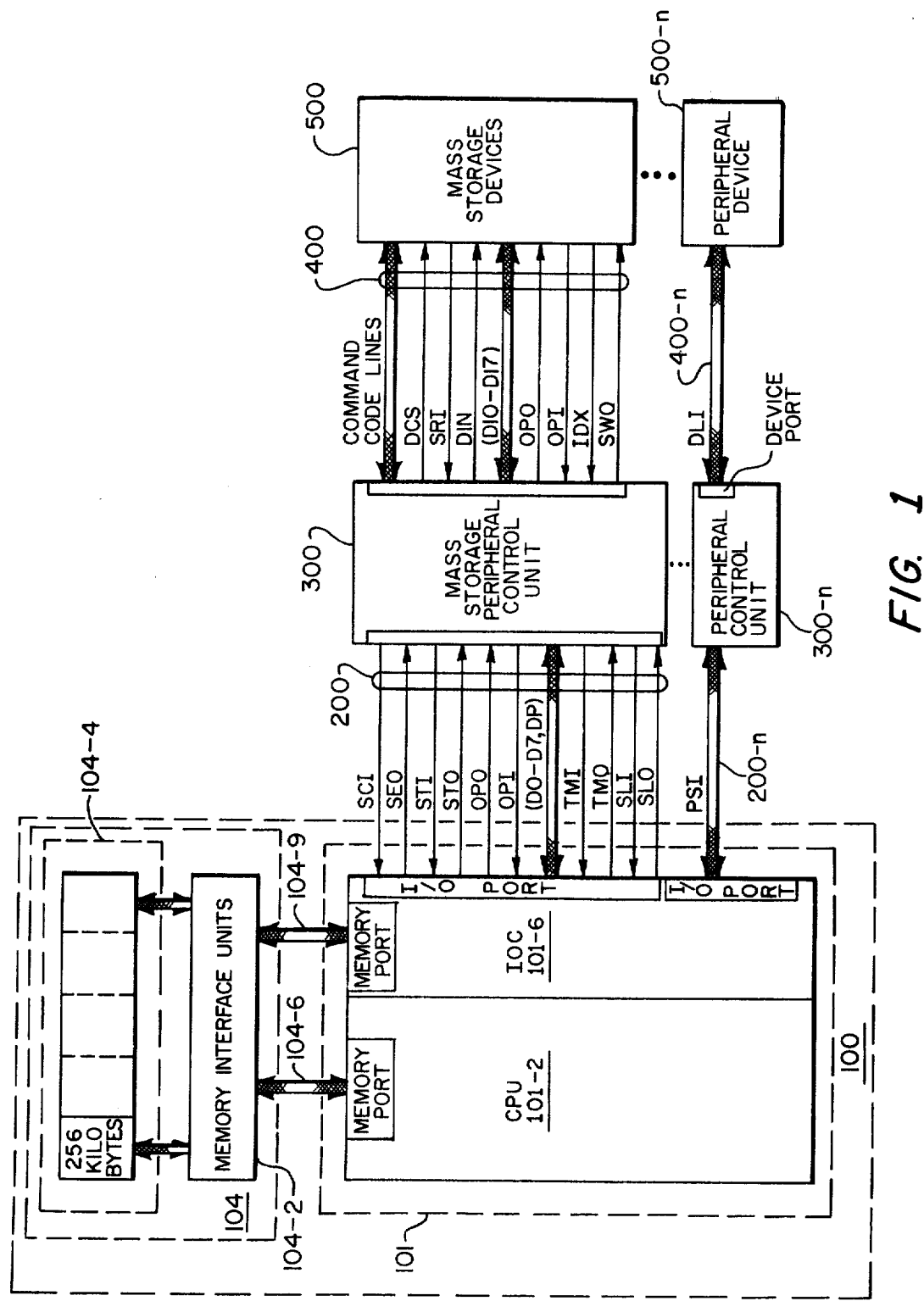
FIG. 1 is a block diagram of a system employing the interface using the principles of the present invention.

Referring to FIG. 1 there is shown an overall block diagram of the data processing system employing the interface arrangement of the present invention. The system includes a central processor complex (CPC) which includes those units used for addressing main storage, for retrieving or storing information, for performing arithmetic and logical operations upon data, for sequencing instructions in the order desired and for initiating communications between main storage and external devices. The main units of the central processor complex 100 includes a central processor unit (CPU) 101-2, a main memory subsystem 104 and an input/output controller (IOC) 101-6. The CPU executes instructions of one or more programs stored in the main storage subsystem 104. The IOC is that part of the system involved in the execution of commands used to carry out an input/output operation. An input/output operation is defined by a channel program. The program includes a plurality of instructions called commands. The operation is executed by a "channel". The channel includes the I/O facilities, the hardware link between the IOC 101-6 and PCU 300 termed a physical channel and a logical channel. The logical channel is a collection of facilities in a PCU 300 which is required to execute an input/output I/O operation defined by a channel program. Since channels are well known in the prior art, their operation will not be described in further detail herein.

A peripheral subsystem interface (PSI) 200 provides a transfer and control link for exchanging information between a mass storage peripheral control unit PCU 300 and an input/output control unit IOC 101-6. The exchange is accomplished by controlling the logical state of various signal lines in accordance with pre-established rules implemented through a sequence of signals termed "dialog". This type of dialog arrangement is illustrated in U.S. Pat. Nos. 3,742,457 and 3,753,236. The interface includes a Service Code In Line SCI, a Service Enable Out Line SEO, a Strobe In Line STI, a Strobe Out Line STO, a Terminate In Line TMI, a Terminate Out Line TMO, an Operational In Line OPI, an Operational Out Line OPO, Data Bus Lines D0-D7, DP, Suppress Interlock, In SLI, and Suppress Interlock Out, SLO. The description of the interface lines are given in greater detail in the section to follow.

PERIPHERAL SUBSYSTEM INTERFACE LINES

| Designation | Description |
|---|---|
| D0-D7, DP | The data path lines are a one byte wide bidirectinal path (8 bits plus parity) that extends between the MSPCU and the IOC. The nature of the information on the data lines (i.e. data, service code, etc.) is determined by the dialog. There can typically be more than one set of data lines D0-D7. |
| SCI | The service code in line extends from the MSPCU to th IOC. When set, SCI indicates that the MSPCU has a service code sequence to send to the IOC. This line is fully interlocked with a Service Enable Out Line. The MSPCU only transfers the Service Code Sequence when the SEO line is high. The SCI line becomes high only when the SEO line is low. |
| SEO | The Service Enable Out Line extends from the IOC to the MSPCU and indicates when the IOC is ready to receive a service code sequence. The line is fully interlocked with the SCI line. |
| OPI | The Operational In Line extends from the MSPCU to the IOC. This line indicates the operational state of the MSPCU to the IOC. When activated, the OPI line indicates that the MSPCU is operational and capable of communicating with the IOC. When deactivated, it means that the MSPCU is powered down or is in a state that makes it incapable of responding to signals on the PSI. |
| OPO | The Operational Out Line extends from the IOC to the MSPCU. This line indicates the state of the IOC. When activated, it indicates that the IOC is operational and capable of communication with the MSPCU. When deactivated, it signals that the IOC is powered down or is in a state that makes it incapable of responding on the PSI. |
| STI | The Strobe In Line extends from the |

-continued

PERIPHERAL SUBSYSTEM INTERFACE LINES

| Designation | Description |
|---|---|
| | MSPCU to the IOC. This line in conjunction with the Strobe Out Line controls data transfers on the interface. For a read operation (i.e. data from the MSPCU), the STI line can only be set when STO/TMO is reset. The STI line indicates to the IOC that data is present on the data lines. To obtain the data, the IOC responds by setting either STO or TMO when the MSPCU detects the rise of STO/TMO, it resets the STI line. When the IOC detects the fall of the STI line, it takes the data from the lines. For a write operation, the roles of lines STO and STI are reversed. The IOC raises line STO when it puts data on the data lines. When the MSPCU detects the rise of line STO and it is ready to receive the data, it raises either line STI or line TMI. When the MSPCU detects the fall of line STO, it takes the data from the data line. |
| STO | The Strobe Out Line extends from the IOC to the MSPCU. This line is used by the IOC to indicate its participation in the dialog on the interface. For a read operation, STO is raised by the IOC when it detects the rise of STI (or TMI) and it is ready to obtain the data. On a read operation, STO cannot be raised if STI and TMI are both logical 0. When the MSPCU detects the rise of STO, it lowers STI (or TMI). Upon detecting the fall of STI (or TMI), the IOC takes the data from the data lines. If necessary, the IOC can hold up the dialog at this point by delaying the fall of STO. When it is ready to proceed, it lowers STO, indicating to the MSPCU that the data has been taken and that the data lines can now be altered. If the IOC terminates the current dialog, it wll do so by raising TMO instead of STO for the last byte to be transferred. For a write operation, the STO line indicates to the MSPCU that the IOC has data ready for it. The IOC puts the data on data lines and raises STO. The STO line may not be activated for a write operation unless the STI and the TMI lines are reset. The STO line must be reset when STI (or TMI), is activated. When the MSPCU detects the fall of STO, it may then take the data. If necessary, the MSPCU can hold up the dialog at this point by delaying the lowering of the STI (or TMI). When ready, the MSPCU lowers STI (or TMI) indicating to the IOC that the data lines can now be altered. |
| TMO | The Terminate Out Line extends from the IOC to the MSPCU. This line is used by the IOC to end the current dialog. For a write operation, TMO can indicate one of the following conditions: 1. For a data transfer, TMO implies that a byte being transferred is the last byte of a field and the data count is exhausted. Since data chaining is transparent to the MSPCU, TMO rises only when the count of the last data chain CCE in the data chain array is exhausted. 2. For a command or IOC instruction transfer, TMO indicates that the transfer is complete with the byte being sent on the current transfer and that no more bytes are sent or forthcoming. During a write operation, TMO can only rise if STI and TMI are low, and fall when the IOC detects the rise of STI (or TMI). For a read operation, TMO is used in one of the following ways: 1. In a data transfer, TMO indicates that a byte being |

PERIPHERAL SUBSYSTEM INTERFACE LINES

| Designation | Description |
|---|---|
| | transferred exhausted the data count. Since chaining is transparent to the MSPCU, TMO will only rise when the counts associated with the last data chain CCE of the data chain array is exhausted.<br>2. In a Service Code Sequence, TMO will be used in one of the following ways:<br>a. The IOC may raise TMO to stop the transfer of the sequence immediately (e.g. after detecting an error);<br>b. The IOC has received a maximum number of status bytes it can handle and the MSPCU is to stop any further transmission of status bytes in the service code sequence.<br>In a read operation, TMO will be used in one of the above ways by being set instead of STO. During a read operation TMO can only rise if STI (or TMI) is high, and will fall when STI (or TMI) falls. This line must be reset to a logical 0 state when not in use. |
| TMI | The Terminate In Line extends from the MSPCU to the IOC. This line is used by the MSPCU to end current dialog.<br>For a write operation, TMI is set instead of STI and can indicate one of the following conditions:<br>1. For a data transfer, TMI indicates that a byte being received is the last byte the MSPCU will accept for this transfer sequence (e.g., media is exhausted), or that the MSPCU is temporarily suspending the data transfer sequence.<br>2. For a command transfer, TMI indicates that a byte being received is the last byte required by the MSPCU.<br>For a read operation, TMI is set instead of STI to indicate one of the following conditions:<br>1. For a data transfer, TMI indicates that a byte being transferred is the last byte available from the media for this data transfer sequence, or that the MSPCU is temporarily suspending the data transfer sequence.<br>2. For a service code sequence, TMI indicates that the byte(s) being transferred is the last byte in the service code sequence. TMI must be set to logical 0 when not in use. |
| SLI | Suppress Interlock In Line SLI extends from the MSPCU to the IOC. A control signal on this line activates a request from the MSPCU to the IOC to establish non-interlocked transfer of command bytes, control bytes, data bytes or a mixture of these as defined by combinations of the command, control data identification signal bundle of the interface. |
| SLO | Suppress Interlock Out Line SLO extends from the IOC to the MSPCU. When SLO is activated in conjunction with the SLI line above, the interface between MSPCU and IOC is ready to proceed with information transfers in the non-interlocked mode. |

As seen from FIG. 1, the IOC 101-6 is capable of controlling a plurality of physical channels designated 200-1 through 200-n which connect the IOC with one of a number of peripheral control units 300 through 300-n. Each peripheral control unit exchanges information with each of its associated peripheral devices over a device level interface (DLI) according to specific dialog sequences. The various lines which comprise the device level interface and descriptions are set forth in the table herein to follow.

| Designation | Description |
|---|---|
| DCP, DC0–DC5 | The command code lines carry encoded commands from the mass storage processor peripheral control unit MSPCU, the mass storage device (MSD) for decoding and execution. |
| DIP, D0–D7 | The 9 bidirectional lines are used to transfer data, address, control and status information between the MSPCU and MSD. |
| DCS | A device command strobe line when at a logical 1 signals when the signals of the command code lines are valid for sampling. |
| OPI | An Operational In Line which signals that the MSD is existent, powered up and capable of communication with the MSPCU. |
| IDX | An index mark line when at a logical 1 for 2 microseconds indicates the beginning of a logical track. |
| OPO | An Operational Out Line which signals that the MSPCU is existent, powered up and capable of communication with the MSD. |
| DIN | A device initialize line which causes a MSD to place all its storage elements in an initialized state. |
| SRI | A serial read in line which during a write operation signals the MSPCU that the MSD is executing a write command. The MSD activates this line upon receipt of a write command and does not reset it until the trailing edge of DCS. During a read operation, this line contains the information read from the media. The read signal is produced by the heads, amplified and converted into SRI line. It contains a pulse for each transistion recorded on the medium. This line is also used as a strobe to control interface dialog when information is transmitted over the bidirectional data lines. |
| SWO | A serial write out line transmits the information to be written. It contains a single logical 1 pulse for each transition to be recorded on the medium. This line is also used as a strobe to control interface dialog when information is transmitted over the bidirectional data lines. |

The device level interface provides for the exchange of data and control information between a peripheral control unit and connected peripheral devices. It will be obvious that the interface lines are only common to a specific type of device. The specific interface illustrated connects a mass storage device 500 to the mass storage peripheral processor 300 as shown in FIG. 1 and for the purposes of the present invention, can be considered conventional in design. Just as the IOC 106 is capable of exchanging data and control information between a plurality of peripheral control units, each peripheral control unit can exchange data and control information between it and a plurality of peripheral devices. For simplicity, only a single peripheral device is illustrated as being connected to each PCU of FIG. 1.

Continuing on with a general description of FIG. 1, it is seen that the memory subsystem 104 includes a memory interface unit 104-2 and a main memory 104-4. As shown, the main memory subsystem can have from one-four memory ports, each port providing a storage capacity of 256 kilobytes. The memory interface 104-2 includes the logic and control circuits required for establishing communication between a memory port and the CPU and IOC. For the purposes of the present invention these units can be considered conventional in design. As seen from FIG. 1, the main memory subsystem comprises one-four main memory units 104-4 each coupled with a part of the central processor complex via a corresponding one of the cables 104-6 through 104-9 as shown. Each main memory unit includes a memory controller or main store sequencing unit and up to eight memory subunits. Each subunit includes four sections, each of which includes an 8K by 10 bit memory array. Each main memory controller is operative to perform the necessary read/write memory operations required for accessing a word of information which is typically comprised of four 9 bit bytes of information.

Before beginning a description of the invention, first a discussion of the manner in which information appears in the peripheral storage system in which the present invention can be used will be given. This description is given by way of example only and should not be construed as a limitation of the present invention.

Information is generally stored along circumferential tracks on a rotating device such as a disk (not shown) in records comprising a number of information fields. These fields include a count field, a key field and a data field. Normally, index mark indicates the physical beginning of each track and all tracks on a disk pack are synchronized by the same index mark. Each track is headed by a home address field for address identification and a track descriptor record (record R0) for indicating the physical condition of the track. Each of the fields of information recorded on the track are separated by gaps. The gap lengths vary depending upon the storage device, location within the record, format, bit density and the record length.

An address marker indicates the beginning of each record for control purposes. Each address marker is proceeded by a synchronization area which includes a plurality of synchronization signals used to synchronize timing circuits used in the performance of a read operation.

Figure 2:
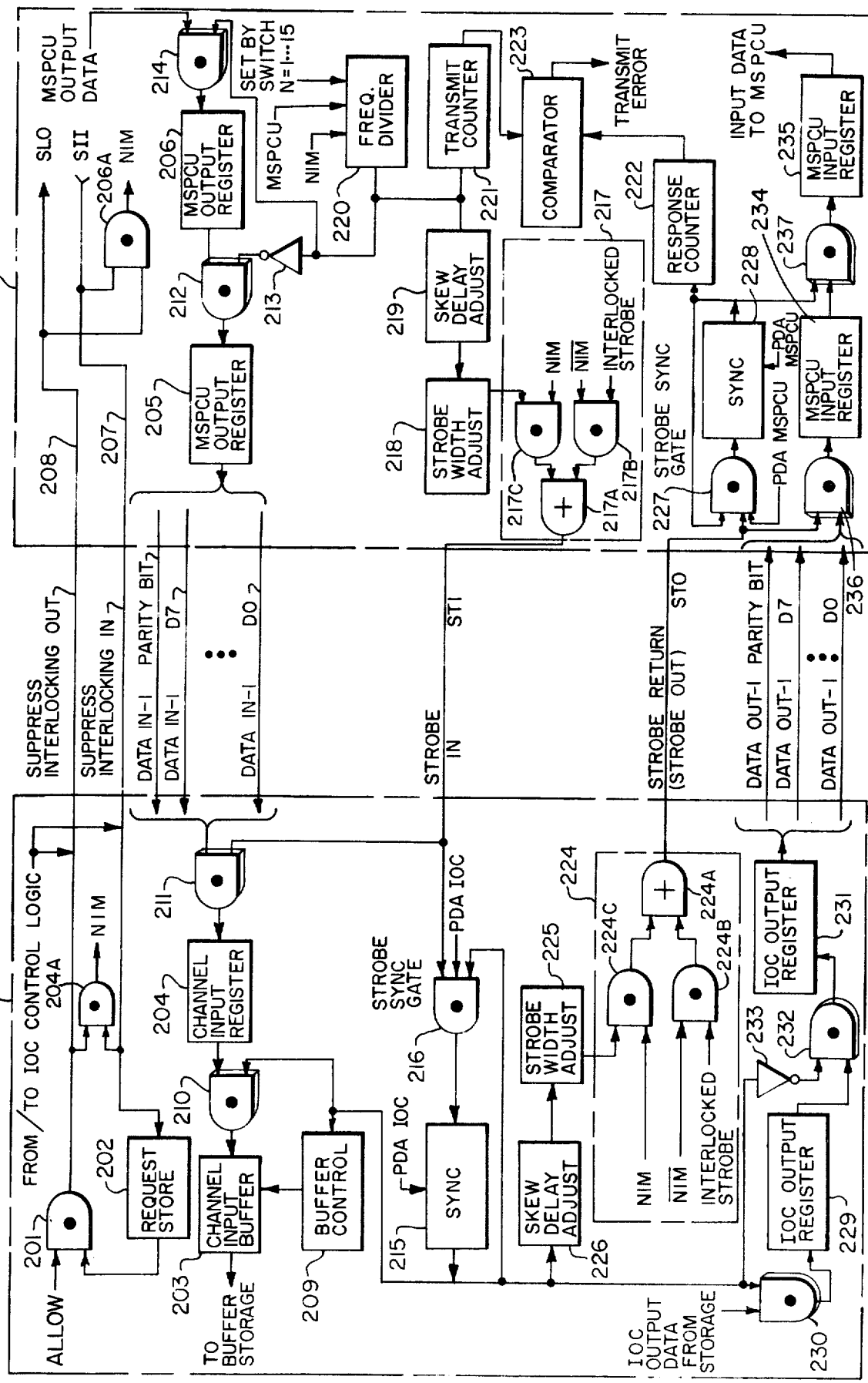
FIG. 2 shows in greater detail the circuits for implementing the present invention.

Referring now to FIG. 2 there is shown in greater detail the portions of the IOC 101-6 and the mass storage peripheral control unit MSPCU 300 which form the information transfer interface between the IOC and the MSPCU.

In general, two interface lines Suppress Interlocking In 207, designated SLI, and Suppress Interlocking Out 208 designated, SLO are provided in addition to the interface function lines described supra. Data lines D0-D7, DP are the same as data lines D0-D7, DP of FIG. 1. For purposes of illustration, the bus lines D0-D7, DP are represented by two groups of lines. However, as mentioned previously, the bus is bidirectional and thus would have transmit and receive circuits connected at the end of each line. Moreover, the Strobe In Line STI of FIG. 2 is the same as the STI line of FIG. 1 and the Strobe Out Line STO of FIG. 2 is the same as the STO Line in FIG. 1. The Non-Interlocked Mode is entered when a control signal SLI activates a request from the MSPCU to the IOC to establish non-interlocked transfer of command bytes, control bytes, data bytes or a mixture of these as defined by combinations of the command, control and data identification signal bundle of the interface. When the corresponding signal SLO Suppress Interlocking Out Line 208 is activated from the IOC to the MSPCU the interface is then ready to proceed with information transfers in the non-interlocked mode using Strobe In and Strobe Out pulses at a predetermined nominal width and frequency. Either control signal can be used to terminate the non-interlock mode of transfer once it has been established. Thus the MSPCU's suppress interlocking control signal has two functionalities: (1) to request entry into non-interlock mode, and (2) as a mode termination indicator in the case of normal completion of transfer or of error while in the non-interlocked mode of operation. Likewise, the IOC's suppress interlocking control signal has two functionalities: (1) to acknowledge the channel's conditioning/preparedness to enter non-interlock mode, and (2) as a mode escape indicator in the case of error while in the non-interlock mode of operation.

During the transmission of non-interlocked information, the receiving side (IOC) of the interface generates a 'strobe return' (Strobe Out) pulse for each strobe (Strobe In) pulse received from the transmitting (MSPCU) side, and the MSPCU counts the number of occupied strobe pulses transmitted as well as the number of strobe return pulses received. The transfer operation is checked by comparting the output of transmit and response counters after the transmission is complete. An inequality results in generation of a non-interlock mode error indication.

As an added error detection capability each interface path is wired to indicate a maximum number of successive bytes which may be transmitted in non-interlock mode without error. An attempt to transmit more than this number of bytes will generate a non-interlock mode error indication. Non-interlock mode transmissions of 4, 80, 256 or 1,000 occupied strobes may be utilized depending upon application block length requirement.

Buffer length checking functionality is manageable with this approach of information transfer, since either input or output transfer is always initiated at the MSPCU end of the interface. From (1) count of strobes transmitted, (2) count of strobe returns, and (3) IOC indication of IOC detected stop condition (coincidence of other control signal e.g. TMO) all of the intelligence required can be derived to determine equal or unequal length for the transfer operation.

Referring now in greater detail to FIG. 2 the Non-Interlocked Mode of Operation is initiated when a request for a Non-Interlocked Mode of Operation is made by the MSPCU on SLI line 207 and stored in request store 202. (The request store may be any convenient store such as a flip-flop or other form of signal storage register). This request signal drives one input of AND gate 201 high; thus when the other input of the AND gate is driven high by an allow or enable signal derived internally to the data processing system (the data processing system and/or IOC must determine its ability to service the high speed transfer, i.e. this is an appropriately high priority request at the current instant of time, memory bandwidth and IOC service bandwidth are available to honor this request, etc.); then both inputs of AND gate 201 are high, AND gate 201 is enabled and the SLO line 208 goes high; thus when both the SLI line 207 and SLO line 208 are high the inputs to AND gate 206A are high and AND gate 206A is enabled to provide the Non-Interlock Mode Enable (NIM) signal. The NIM signal is applied to frequency divider 220 and also applied to AND gate 217C of gate assembly 217. Frequency divider 220 may typically be a conventional transistor-transistor logic high-speed ripple through counter or shift register integrated circuit module commercially available. The output of frequency divider 220 is dependent on the NIM input signal, a MSPCU PDA pulse input which is derived from the MSPCU system clock and a switch input which is set at installation time to the reception capability of the IOC or data processing system. The output of the frequency divider 220 is coupled to one input of AND gate 212 through inverter 213, to an input terminal of AND gate 214 and also to the input terminal of skew delay adjust 219. MSPCU output data is applied to MSPCU output register 206 through AND gate 214 under control of the output of frequency divider 220. The output signal from frequency divider 220 is also applied to inverter 213 where it is inverted and applied to one input terminal of AND gate 212; the other input terminal of AND gate 212 is coupled to MSPCU output register 206. The data in MSPCU output register 206 is then transferred to the final MSPCU output register 205 during the interval when the output signal of frequency divider 220 is low. MSPCU output register 205 then directly places the data on the data bus-in comprised of lines D0-D7 and the parity bit line. The output signal from frequency divider 220 is also applied to transmit counter 221 where each pulse is used to establish a count and represents a byte transmitted. As previously noted, the output of frequency divider 220 is also applied to the input terminal of skew delay adjust 219 (which may typically be a delay line) where it is delayed by a sufficient amount to provide protection in the skewness of data being transmitted over the connecting wires or cables. The skew delay adjusted pulse is then applied to strobe width adjust 218 where it is adjusted to fit the requirements of the data processing system or IOC, interface cable length, and interface transfer rate desired. The strobe width adjust 218 may typically be any commercially available delay line or other local resonant circuit. The output signal from strobe width adjust 218 is applied to one input terminal of AND gate 217C thus enabling AND gate 217C when the NIM enable signal is high. Since the output signal from AND gate 217C is fed into OR gate 217A a strobe-in signal STI is provided for strobing non-interlocked mode data on data bus D0-D7 into the channel input register 204 through AND gate 211. The purpose of OR gate 217A is to provide the optionality of non-interlocked mode strobe control versus normal asynchronous D.C. interlocked strobe control. In the absence of the NIM enable signal, gate 217B directs the normally interlocked strobe signal through to OR gate 217A when interlocked strobe input signal to AND gate 217B is high. It will be noted that each line of data bus D0-D7, DP comprises input signals each of which are placed on one input of 9 identical AND gate 211's (only one of which is shown on the drawing of FIG. 2) whereas the other input of each AND gate 211 is the STI signal, and so forth for AND gates 210, 212, 214, 230, 232, 236 and 237.

The data received from the MSPCU is then synchronized to the data processing system's own internal clock. It will be noted that an internally synchronized gating signal is developed using the STI signal as input to AND gate 216, the IOC PDA pulse derived from the IOC system clock and SYNC circuit 215 (the SYNC circuit can be a conventional holding latch or J-K flop type of logic circuit). Thus, circuits 215 and 216 allow final synchronization of the strobe signal with the internal clocking system of the IOC data processing system to take place.

As previously discussed, the STI signal has also enabled AND gate 211 thus permitting data to be stored in channel input register 204. The output signal from channel input register 204 is applied to one input terminal of AND gate 210 which is enabled when a signal from SYNC circuit 215 is applied to the other input of AND gate 210 thus permitting the data in channel input register 204 to be transferred to the channel input buffer 204 (in synchronism with the IOC internal clock). Data in channel input buffer 203 is then applied to the buffer storage of the data processing system (not shown on FIG. 2). Note that the channel input buffer 203 is under control of buffer control 209 which in turn is synchronized by SYNC circuit 215 so as to coordinate the transfer of data to buffer storage with other activities within the data processing unit.

It will be noted that on the IOC side the strobe width adjust 225, skew delay adjust 226 and gate assembly 224 correspond to strobe width adjust 218, skew delay adjust 219 and gate assembly 217 of the MSPCU unit. Their functions are similar except the gate assembly 217 enables a strobe signal STI when data is to be requested by the MSPCU from the IOC or transferred from the MSPCU to the IOC, whereas the gate assembly 224 provides an STO signal to strobe data from the IOC to the MSPCU or acknowledge receipt of data by the IOC from the MSPCU. More specifically a synchronized signal from SYNC circuit 215 is applied to the skew delay adjust 226 where adjustment is made for time delays of the signal over the transmission cables and then applied to the strobe width adjust 225 where its width is adjusted to compensate for transmission back in the opposite direction (i.e. from the IOC to the MSPCU), and finally it is applied to one input terminal of AND gate 224C which is enabled when the NIM signal is high thus providing a strobe signal STO through OR gate 224A. The purpose of OR gate 224B is to provide the optionality of non-interlocked mode strobe control versus normal asynchronous D.C. interlocked strobe control. In the absence of the NIM enable signal normally developed by AND gate 204A (as previously described with respect to AND gate 206A) gate 224B directs the normally interlocked strobe signal through to OR gate 224A when interlocked strobe input signal to AND gate 224B is high. When data is to be transmitted from the IOC to the MSPCU, it is stored in IOC output register 229 which is transmitted through AND gate 232, when it is enabled, to the IOC output register 231 which places it on the data out bus D0-D7 to be transmitted under strobe out control STO to MSPCU output register 234 via 9 identical AND gates 236 one of which is shown for clarity. Note that each AND gate 236 is enabled when the STO signal on one of its input terminals is high and a corresponding one of the data lines on the other input terminal of each AND gate 236 is high. Note also that AND gate 232 is enabled when the SYNC signal from SYNC unit circuit 215 is low since inverter 233 inverts the signal and provides a high input signal to AND gate 232. Note also that the strobe out signal STO is received on one input terminal of AND gate 227 where it, the MSPCU PDA pulse derived from the MSPCU system clock and SYNC circuit 228 are used to develop an internally synchronized gating signal. (In similar fashion as described for items 215 and 216 in the IOC). Note that data is applied from the IOC unit via data out bus D0-D7 to the first MSPCU input register 234 through AND gate 236 under a raw strobe signal STO i.e. not synchronized to the PDA clock pulses of the MSPCU unit; however the data is then transferred to the MSPCU input register 235 via AND gate 237 under the synchronized STO pulse which emerges from SYNC unit 228. Finally it is seen that input data is applied to the buffer (not shown) of the MSPCU unit.

Referring now to FIG. 3 there is shown the timing diagram for the interface between the MSPCU and the IOC. The arrow on FIG. 3 shows the sequence of operations that takes place. Traversing from the tail end of the arrow there is shown the timing diagram wherein data stored in the MSPCU output register 205 (of FIG. 2) is placed on the data bus D0-D7. The strobe in line STI has its signal raised via the strobe enable gate 217 (previously described with respect to FIG. 2) after an appropriate time $t_s$. Signal $t_s$ is the skew interval and is established by the skew delay adjust unit 219 shown on FIG. 2. The width of the strobe signal, $t_{wt}$, is established by the strobe width adjust unit 218 shown on FIG. 2. The next event in the dialog shown on FIG. 3 is to transmit the strobe in signal across the interface during a time interval $t_c$ which as previously described allows for cable delay in the actual interface. This permits the data on data bus D0-D7 to be applied to AND gate 211 where it is then gated as previously described into the IOC unit. It will be noted however that once the MSPCU has sent its first strobe signal, the internally set rate dictates the time at which the second strobe signal will follow. Accordingly, after the first strobe signal has clocked the first byte of data another byte of data sequentially following can be clocked onto data bus D0-D7 from MSPCU output register 205 and then followed by a second strobe signal from strobe gate 217 at the rate established by the infrequency divider 220 output. Note that the sequence dependence is purely on the MSPCU side of the interface. The sequence dependency starts with a data bus signal, proceeds to the strobe in signal, back to the data bus signal followed by another strobe in signal etc. so that there is no interlocking relationship with the signals from the opposite side of the interface.

What is claimed is:

1. An improved demand response interface in which a data processing unit is capable of demanding the transfer of information up to a maximum asynchronous byte transfer rate from another unit by energizing a demand line connecting the two units and in which each data byte is transferred to said data processing unit in synchronization with the energization of a response line connecting the two units and energizable by said another unit and wherein the receipt of each data byte is signalled by said data processing unit by de-energizing said demand line, said interface further including apparatus for enabling said interface for exceeding said maximum asynchronous byte transfer rate, said apparatus comprising:

at least first and second control lines connecting said data processing unit and said another unit;

first means included in said another unit and connected to said first line, to said demand line and to said response line, said first means including means for generating a first control signal on said first control line requesting that data bytes are to be transferred at a rate greater than said maximum asynchronous rate;

second means included in said data processing unit and connected to said second lines, to said response line and to said demand line, said second means being responsive to said first control signal to generate a second control signal on said second control line signalling allowance of byte transfer at said rate greater than said maximum asynchronous rate; and, enabling means included in each of said units and connected to said first and second control lines and to said first and second means, each said enabling means being jointly responsive to said first and second signals for generating a signal enabling said first and second means of said units to transfer data bytes across said interface at said rate greater than said maximum asynchronous rate by applying signals to said demand and response lines.

2. The interface according to claim 1 wherein said first and second means each includes strobe generating means coupled to said demand and response lines of said interface for receiving normal energizing signals from said demand line and said response line respectively, and said strobe generating means of said unit being coupled to said enabling means and being selectively conditioned to generate said signals for synchronizing a transfer of bytes at rates greater than said maximum asynchronous rate.

3. The interface according to claim 2 wherein each of said strobe generating means is coupled to receive a clocking signal from a corresponding one of said units for developing said synchronizing signals independently of said energizing signals for said transfer of bytes greater than said maximum asynchronous rate.

4. The interface according to claim 2 wherein said another unit includes counter means coupled to said strobe generating means of said unit, said counter means being operative to develop a count for checking a number of synchronizing signals applied to said demand line by said data processing unit with the number of synchronizing signals applied to said response line by said unit, for detecting an error in said transfer.

5. The interface according to claim 4 wherein each of said strobe generating means includes strobe width adjusting means for establishing a predetermined width for each of said synchronizing signals in accordance with predetermined physical characteristics of said interface.

6. The interface according to claim 1 wherein said enabling means includes gating means for logically combining said first and second signals for generating said enabling signal.

7. An input-output interface in which a pair of control units each generate demand signals for transfer of information bytes up to a maximum asynchronous byte transfer rate from one another in an interlocked mode of operation by one of said units energizing a demand line connecting said units and in which each data byte is transferred to the other of said units in synchronization with the energization of a response line connecting said units and energizable by said other unit and wherein the receipt of each byte is signaled by said one unit by de-energizing said demand line, said interface including apparatus for operating said interface in a non-interlocked mode in which said byte transfers exceed said maximum asynchronous byte transfer rate, said apparatus comprising:

first and second control lines connecting said units;

first control means connected to said demand line, to said response line, and to said first and second control lines, said first control means for generating a first control signal on said first control line for signaling when bytes can be transferred across said interface in said non-interlocked mode of operation;

second control means connected to said demand line, to said response line and to said first and second control lines, said second means being responsive to said first control signal to generate a second control signal on said second control line signaling allowance of said transfer in said non-interlocked mode; and, enabling means connected to said first and second control lines, to said first and second control means and to said demand and response lines, said enabling means being jointly responsive to said first and second signals for generating signals to condition said first and second control means for generating signals on said demand and response lines required for operating said interface in said non-interlocked mode of operation.

8. The interface according to claim 7 wherein said first and second control means each include strobe generating means coupled to said demand and response lines of said interface for receiving normal energizing signals from said demand line and said response line respectively, and said strobe generating means of each unit being coupled to said enabling means and being selectively conditioned to generate said signals for synchronizing a transfer of bytes at rates greater than said maximum asynchronous rate.

9. The interface according to claim 8 wherein each of said strobe generating means is coupled to receive a clocking signal from a corresponding one of said units for developing said synchronizing signals independently of said energizing signals for said transfer of bytes at a rate greater than said maximum asynchronous rate.

10. The interface according to claim 8 wherein a predetermined one of said control units includes counter means coupled to said strobe generating means of said one unit, said counter means being operative to develop a count for checking a number of synchronizing signals applied to said demand line by the another of said units with the number of synchronizing signals applied to said response line by said unit, for detecting an error in said transfer.

11. The interface according to claim 10 wherein each said strobe generating means includes strobe width adjusting means for establishing a predetermined width for each of said synchronizing signals in accordance with predetermined physical characteristics of said interface.

12. A data processing system in which a demand response interface between first and second control devices when operated in its normal mode controls the transfer of data and control bytes over a bidirectional bus by at least a first d-c signal level on a demand line of said interface for indicating to said first control device that a byte has been placed on said bus by said second control device and a second d-c signal level generated by said first control device and applied to a response line of said interface for indicating to said second control device that said byte has been accepted by said first control device, said system including apparatus for operating said interface in a high speed mode wherein the transfer of bytes exceeds the maximum asynchronous byte transfer rate of said demand response interface, said apparatus comprising:

first and second lines connecting said control units;

first means connected to said demand-response interface and to said first and second control lines, said first means for generating a first control signal on said first line for signaling a request for transferring bytes in said high speed mode;

second means connected to said demand-response interface and to said first and second control lines, said second means being responsive to said first control signal to generate a second control signal on said second control line signaling allowance of said transfer in said high speed mode; and, enabling means connected to said first and second control lines, said demand-response interface and to said first and second means, said enabling means being jointly responsive to said first and second control signals for generating enabling signals to condition said first and second means for generating signals conditioning said demand-response interface to operate in said high speed mode.

13. The system according to claim 12 wherein said first and second means each include strobe generating means coupled to said demand response interface for receiving said d-c levels therefrom, said strobe generating means of each said unit being coupled to said enabling means and being selectively conditioned to generate said signals for synchronizing a transfer of bytes at rates greater than said maximum asynchronous rate.

14. The system according to claim 13 wherein each said strobe generating means is coupled to receive a clocking signal from a corresponding one of said devices for developing said synchronizing signals independently of said strobe signals for said transfer of bytes greater than said maximum asynchronous rate.

15. The system according to claim 13 wherein a predetermined one of said devices includes counter means coupled to said strobe generating means said counter means being operative to develop a count for checking a number of synchronizing signals applied to said demand line by the other of said devices with the number of synchronizing signals applied to said response line by said unit for detecting an error in said transfer.

16. The system according to claim 15 wherein each said strobe generating means includes strobe width adjusting means for establishing a predetermined width for each of said signals in accordance with predetermined physical characteristics of said interface.

* * * * *

UNITED STATES PATENT OFFICE
CERTIFICATE OF CORRECTION

PATENT NO. : 3,970,997
DATED : July 20, 1976
INVENTOR(S) : Robert M. Daly, John E. Mekota, Jr. & Gary J. Goss It is certified that error appears in the above-identified patent and that said Letters Patent are hereby corrected as shown below:

Column 13, line 11, after "second" insert --control--.

Signed and Sealed this

Fifteenth Day of March 1977

[SEAL]

Attest:

RUTH C. MASON
Attesting Officer

C. MARSHALL DANN
Commissioner of Patents and Trademarks